Aug. 12, 1969　　　　R. N. AUGER　　　　3,460,375
PROXIMITY DETECTION DEVICE USING CONIC/TOROIDAL FLOW
Filed May 11, 1967　　　　　　　　　　　　2 Sheets-Sheet 1

INVENTOR
RAYMOND N. AUGER
BY
Smythe & Moore
ATTORNEYS

Aug. 12, 1969 R. N. AUGER 3,460,375
PROXIMITY DETECTION DEVICE USING CONIC/TOROIDAL FLOW
Filed May 11, 1967 2 Sheets-Sheet 2
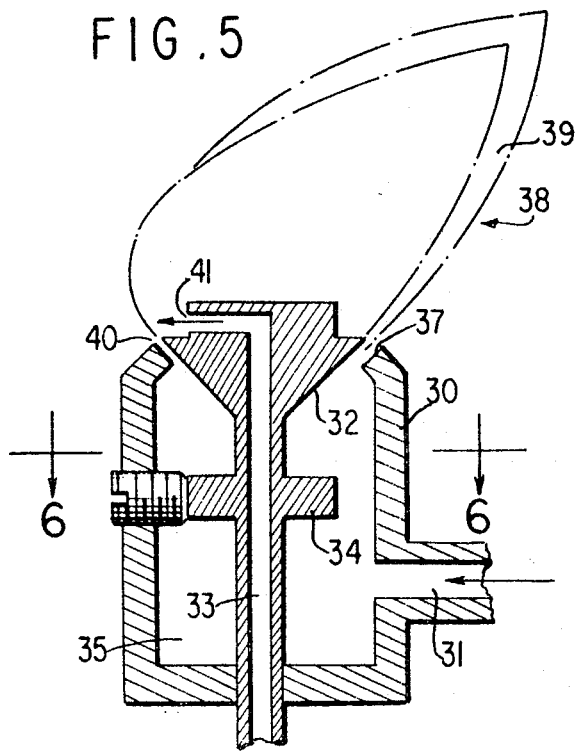
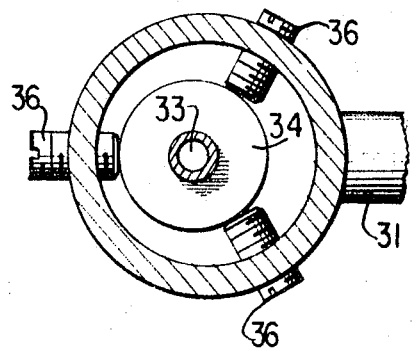
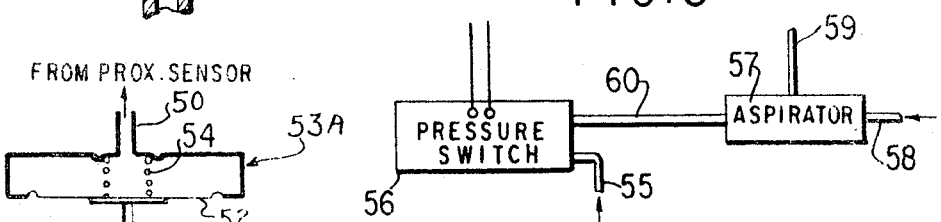
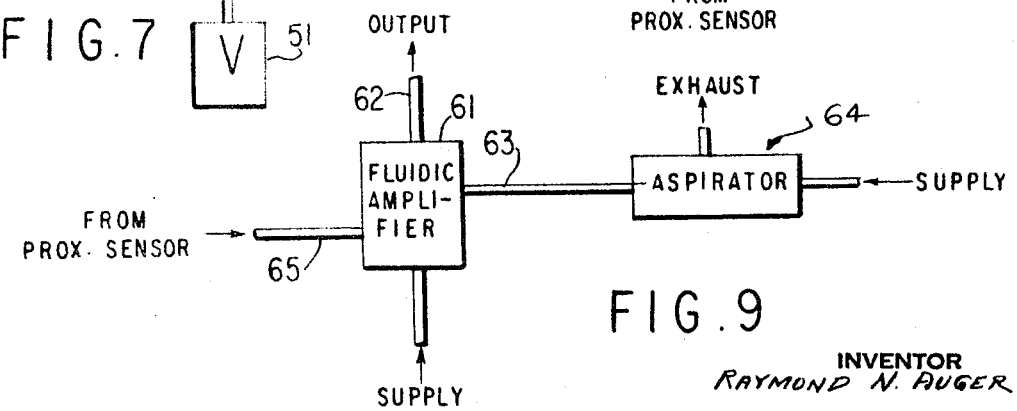
INVENTOR
RAYMOND N. AUGER
BY
Smyth & Moore
ATTORNEYS

United States Patent Office 3,460,375
Patented Aug. 12, 1969

1

3,460,375
PROXIMITY DETECTION DEVICE USING CONIC/TOROIDAL FLOW
Raymond N. Auger, New York, N.Y., assignor, by mesne assignments, to Cutler Controls, Inc., Berwyn, Pa., a corporation of Pennsylvania
Filed May 11, 1967, Ser. No. 637,782
Int. Cl. G01m 3/02
U.S. Cl. 73—37                                    16 Claims

ABSTRACT OF THE DISCLOSURE

A device for detecting proximity to a surface by use of a fluidic conical annular flow producing orifice means which is directed toward the surface to be detected, the flow affecting an output sensing means and giving a signal.

---

This invention relates to fluidic proximity or object detectors employing fluid and flow for detecting the presence of a surface or an object.

The detection of the presence of an object at a given position has been accomplished by various means in the prior art. As an example, photocells and lamp beam combinations, magnetic proximity switches and direct contact with a snap-action switch have been used. Also air gauging apparatus using back pressure signals wherein flow through an orifice is affected by an adjacent surface have been employed. All of these devices have various drawbacks.

One of the objects of the invention is to provide a fluidic proximity detector which is sensitive yet is simple in construction.

Another of the objects of the invention is to provide a proximity detector which has bistable characteristics.

Another of the objects of the invention is to provide a proximity sensor to indicate distance from a surface or object over a greater distance than possible with prior devices.

These and other objects, advantages and features of the invention will become apparent from the following description and drawings.

In the drawings:

FIG. 5 is a view of a modified form of FIG. 1 and

FIG. 6 a sectional view along the line 6—6 of FIG. 5.

FIGS. 7, 8 and 9 are schematic diagrams showing uses of the invention.

Figure 1:
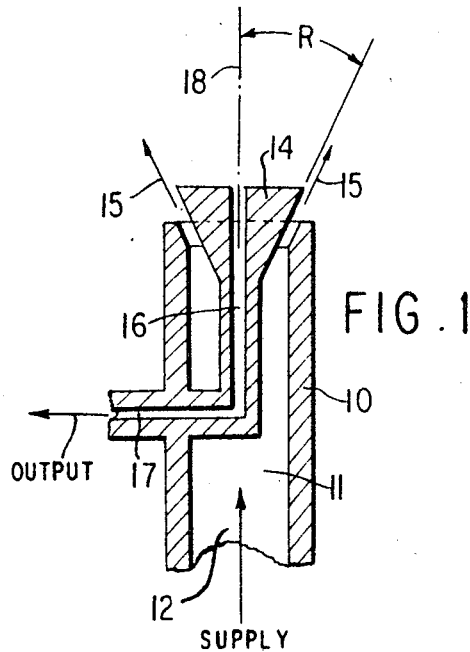
FIG. 1 is a fragmentary sectional view of one form of the invention.

One form of the invention is illustrated in FIG. 1 wherein body 10 has a passage 11 connected to an air or fluid supply at 12. At the outlet or nozzle end 13, there is located a conically shaped member 14 which will direct the fluid flow in a conical annular jet or path 15. As will be described hereafter, jet 15 may assume two different flow patterns with the same environmental and internal pressure conditions. Output signal passage 16 is connected through 17 to any suitable signal sensing or receiving apparatus. For example, it can operate an indicating mechanism or an alarm arrangement to denote a body or surface in a close or predetermined proximity to the nozzle 13.

Figure 2:
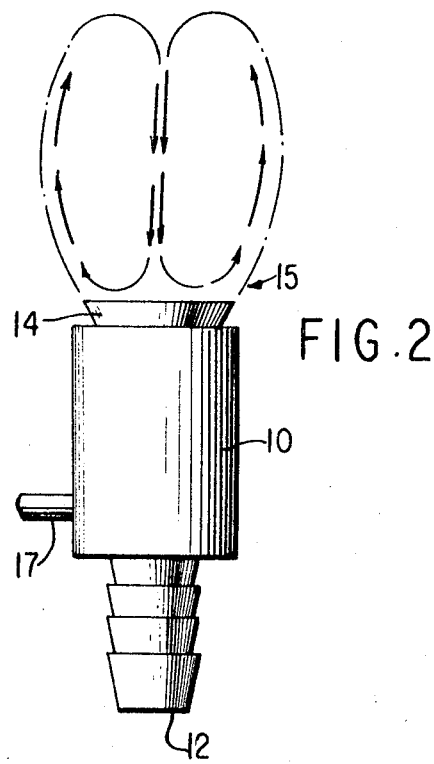
FIG. 2 is a side view of the form shown in FIG. 1, the fluid flow pattern being schematically illustrated.

The angle R of the jet can range from about 25° to 50° relative to axis 18. If the angle R is too great, other factors taken into account, the nozzle flow pattern always will be conical. If R is too small, the pattern shown in FIG. 2 only will exist. Among the factors affecting the flow pattern are the relation of the output passages to the flow and the overall configuration in the vicinity of the nozzle.

Figure 4:
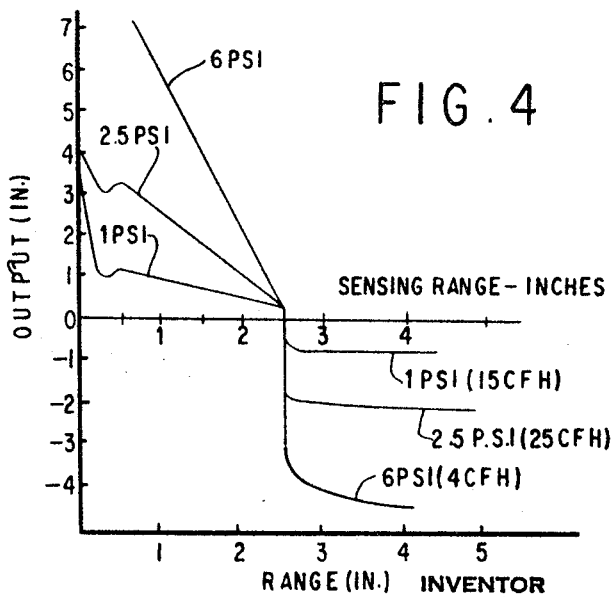
FIG. 4 is a graph showing the relation between the output pressure in inches of water and the distance of the nozzle body from the surface or body being sensed.

Merely by way of example, referring to FIG. 4 a nozzle cone of 0.140 inch in diameter was used. With a 1 p.s.i. air supply, the output signal will switch from positive to negative pressure when the detector is at 0.25 inch from the body. When the air supply is increased, the pressure will switch from positive to negative at 0.25 inch. Thus, it can be seen that the device is a bistable detector with a switching differential of only 0.006 inch.

It can be theorized that in this flow pattern illustrated there is an entrainment of air within the conical jet which causes the air to bend inward. Inward movement prevents atmospheric flow from relieving the subatmospheric pressure which develops within the cone so that a "bubble" is formed with a "skin" of high velocity flow maintaining a subatmospheric center. If the bubble is stressed by a body or surface, it bursts abruptly. As the upward flow impinges on a surface, the flow pattern is changed at a predetermined point or distance therefrom.

As an example, and again referring to FIG. 4, a supply consumption of 15 cubic feet per hour by a nozzle 0.140 inch in diameter will give a signal pressure of somewhat greater than 0.1 inch of water. Such a level is adequate to operate a negatively biased turbulence amplifier or other amplifier.

Figure 3:
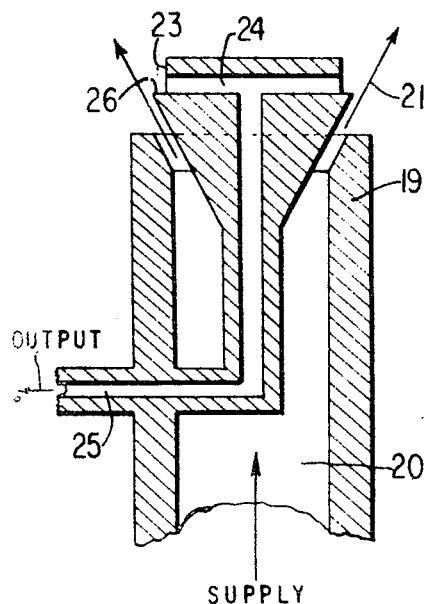
FIG. 3 is similar to FIG. 1 except that the output sensing passage is of a different form.

The arrangement seen in FIG. 3 is similar to FIG. 1 wherein body 19 has a supply passage 20 and an annular jet 21. Conical member 22, however, has a "set-back" surface 23 with output passages 24 connected to output passage 25. The output of the sensor of FIG. 3 is because of a relatively low pressure occuring at the edge 26 of the cone due to entrainment of air by air at this location. The set-back of portion 23 increases output pressure and flow capability.

In a still further form, as illustrated in FIG. 5 and 6, body 30 has inlet or supply passage 31 and conical member 32. Conical member 32 is carried on output tube 33 which tube has a collar 34 thereon. Collar 34 is adjustably positioned in passage 35 by means of screws 36 so that conical member 32 can be eccentrically located relative to the mating walls 37 of the body 30, tube 33 having sufficient flexibility for this purpose.

The flow pattern of the jet 38 will be deflected so that the widest portion 39 of the jet will dominate the narrower portion 40 causing the direction of total flow to be deflected in favor of the direction of the widest portion of the stream. Such will cause the narrow portion of the annular stream to change direction, e.g. on the order of 90°, and to pass near the setback at the point of the orifice of the output passage 41. It will create at this point the lowest pressure around the entire periphery of the cone. A disruption of the bubble then will cause the jet to take a conic shape and to change markedly the pressure at the orifice.

The use of the offset or eccentric nozzle of FIGS. 5 and 6 will result in an increase of output signal up to a factor of 10 over that of FIGS. 1 and 3.

Referring now to FIG. 7 the arrangement can be used to connect with a conventional negatively biased valve means. The output of the proximity sensor described herein is connected to line 50, the valve being illustrated schematically at 51. The valve, for example, may be a valve which is operated by a diaphragm 52 by connection or link 53. Diaphragm 52 is held in chamber 53A in which there is a spring 54 biasing the diaphragm in a direction toward the valve as seen in FIG. 7. When the normally negative pressure of the proximity sensor is applied to line 50 and is changed to a positive pressure, the diaphragm will under the influence of spring 54 move downwardly. Thus, there will be a control combination of the bistable proximity sensor to operate a valve which will provide a means of utilizing the relatively low control pressures involved of the proximity sensor to provide a relatively high working pressure.

Referring now to FIG. 8, the input from the proximity sensor is connected through line 55 to a conventional pressure switch 56. Pressure switch 56 may have vacuum applied thereto by a conventional aspirator or jet pump schematically shown at 57, the supply pressure of which is fed thereto at 58 and the exhaust is seen at 59. The aspirator provides a vacuum through line 60 to the pressure switch 56. By the use of this arrangement there is provided a subatmospheric reference to the pressure switch so that in the arrangement of FIG. 8, the aspirator furnishes a negative reference for the pressure switch.

Referring now to FIG. 9, a turbulence or other type of fluidic amplifier is schematically shown at 61 such as is known in the art. The output of the turbulence amplifier is indicated at 62 and it is exhausted to the atmosphere at 63. The exhaust to the atmosphere is connected in this arrangement to an aspirator 64 to provide a reference. The output signal of the proximity sensor is connected through line 65 to the turbulence amplifier or other fluidic amplifier. The fluidic device thus operates with a subatmospheric signal and a negative reference signal for the device.

It should be apparent that changes may be made in the details of the construction without departing from the spirit of the invention.

What is claimed is:

1. In an object detecting device, the combination including body means, means carried by said body means for producing a conical annular divergent fluid flow therefrom, means for connecting a source of fluid to said flow producing means, and output means adjacent said flow producing means for providing signals in accordance with the position of said body means relative to an object.

2. A device according to claim 1 wherein the body means has a conical opening and the fluid flow producing means is a conically shaped member cooperating with said opening to produce a divergent conical annular jet, the flow pattern of said jet being changed when an object is brought in a predetermined relation thereto so as to change the signal from the output means.

3. A device according to claim 2 wherein the conical opening and the conically shaped member are eccentric relative to each other.

4. A device according to claim 3 including means to adjust the eccentricity of the opening and conically shaped member.

5. A device according to claim 3 wherein the conically shaped member has a set back face portion with a connection therefrom to the output means.

6. A device according to claim 2 wherein the conically shaped member has a set back face portion with a connection therefrom to the output means.

7. A device according to claim 2 wherein there is means connecting said output means to a negatively biased control means.

8. A device according to claim 7 wherein the control means is a pressure switch with a negative reference pressure source connected thereto.

9. A device according to claim 2 wherein there is means connecting said output means to fluidic turbulence amplifier means.

10. A device according to claim 9 wherein there is a negative reference pressure source connected to the turbulence amplifier.

11. A device according to claim 2 wherein there is means connecting said output means to fluidic amplifier means.

12. A device according to claim 1 wherein the output signal changes from positive to negative and thereby provides a bistable indication.

13. A device according to claim 1 wherein the fluid flow producing means is arranged to provide an eccentrically shaped annular jet.

14. A device according to claim 1 wherein there is means connecting said output means to a negatively biased control means.

15. A device according to claim 14 wherein the control means is a valve means actuated by a spring biased diaphragm.

16. In an object detecting device, the combination including body means, nozzle means carried by said body means for producing a conical divergent annular-like fluid flow therefrom, introduction of an objects to be detected into the stream disturbing the mutual attraction effect of at least part of the stream relative to the remainder of the stream to cause a change of pressure at an output zone, and output means adjacent said output zone for providing signals in accordance with the position of said body means relative to an object.

References Cited

UNITED STATES PATENTS 3,371,517   3/1968   Roth _____ 73—37.5

LOUIS R. PRINCE, Primary Examiner

WILLIAM A. HENRY II, Assistant Examiner